United States Patent [19]

Janiszewski

[11] Patent Number: 4,738,149
[45] Date of Patent: Apr. 19, 1988

[54] MOTOR VEHICLE GEARBOX

[75] Inventor: Grzegorz K. Janiszewski, Angered, Sweden

[73] Assignee: AB Volvo, Goteborg, Sweden

[21] Appl. No.: 843,663

[22] Filed: Mar. 25, 1986

[30] Foreign Application Priority Data

Mar. 28, 1985 [SE] Sweden .................. 8501541

[51] Int. Cl.$^4$ .............................. F16H 3/08
[52] U.S. Cl. ...................... 74/330; 74/331; 74/359
[58] Field of Search .......... 74/359, 356, 330, 665 GA, 74/331, 334

[56] References Cited

U.S. PATENT DOCUMENTS

| 1,453,032 | 4/1923 | Soden-Fraunhofen . | |
|---|---|---|---|
| 2,599,801 | 6/1952 | Youngren et al. | 74/331 X |
| 2,612,787 | 10/1952 | Youngren et al. | 74/330 |
| 2,644,340 | 7/1953 | Youngren et al. | 74/330 |
| 2,991,661 | 7/1961 | Rambausek | 74/330 |
| 3,769,857 | 11/1973 | Whateley | 74/359 X |
| 3,802,293 | 4/1974 | Winckler et al. | 74/331 X |
| 4,038,882 | 8/1977 | Keller | 74/359 X |
| 4,461,188 | 7/1984 | Fisher | 74/331 X |

FOREIGN PATENT DOCUMENTS

| 421114 | 11/1981 | Sweden . |
| 433870 | 6/1984 | Sweden . |
| 439279 | 6/1985 | Sweden . |
| 606749 | 5/1978 | U.S.S.R. . |

Primary Examiner—Lawrence Staab
Assistant Examiner—Dwight G. Diehl
Attorney, Agent, or Firm—Young & Thompson

[57] ABSTRACT

The invention relates to a vehicle gearbox of tye type which has two concentrically journalled input shafts connected to a double clutch for alternate engagement. The input shafts drive two intermediate shafts, which lie in a plane offset from the input shafts and having a pair of gears permanently engaged with each other, one of which is the gear for the second gear speed on one of the intermediate shafts, while the other gear is an extra gear freely rotatable and lockable to the hub of the gear for the first gear speed, on the other intermediate shaft. By releasing the gear for the first gear speed from its intermediate shaft and locking the extra gear to the gear wheel hub for the first gear speed, the rotational direction of the second intermediate shaft can be reversed for backing.

4 Claims, 1 Drawing Sheet

MOTOR VEHICLE GEARBOX

The present invention relates to a motor vehicle gearbox, comprising two concentrically journalled input shafts arranged to be driven alternately, and two intermediate shafts having gears engaging gears on the input shafts, at least one gear in each pair of mutually engaging gears on said shafts being releasable from its shaft.

Double input shafts and double intermediate shafts are used inter alia in gearboxes of so-called power shift type, i.e. gearboxes in which the shifting is effected by preselection, so that two input shaft gears are engaged at the same time. Prior to shifting from first speed to second speed for example, the second speed gear is engaged, and thereafter the shifting itself is completed by releasing the clutch for first speed and engaging the clutch for second speed.

Characteristic for gearboxes of this type is, on the one hand, that it is simpler to automate shifting than when using a conventional step-gearbox and, on the other hand, that a given number of gear ratios can be arranged much more compactly than in a conventional gearbox. For these reasons, such gearboxes are particularly useful as automatic stepshifted gearboxes in front wheel drive automobiles with transverse engine, where the engine must be made exceptionally compact, because of limited transverse space in the engine compartment.

The purpose of the present invention is in general to achieve an even more compact design of a gearbox of the type described by way of introduction than what has previously been known.

This is achieved according to the invention in a motor vehicle gearbox of the above mentioned type which is characterized in that the input shafts lie in a plane spaced from the plane defined by the intermediate shafts and that the intermediate shafts have a pair of mutually engaging gears, one of which is freely rotatable and can be locked by means of a locking means for rotation together with that releasable gear on the intermediate shaft which provides the highest forward gear ratio, the other gear of said pair of mutually engaging gears on the intermediate shafts being the releasable gear providing the next highest forward gear ratio.

The arrangement according to the invention eliminates the head for a separate shaft of the idler gear for reverse. One of the intermediate shafts is used as a reverse gear shaft instead. An extra gear with engaging sleeve on one of the intermediate shafts is all that is needed for reverse and this single gear replaces three gears in previous arrangements thus reducing the number of gears by two. This results in turn in lower weight, more compact design and lower costs.

The invention will be described in more detail with reference to an example shown in the accompanying drawing.

Figure 1:
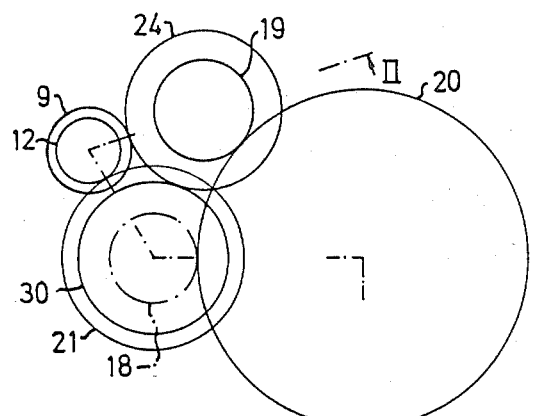
FIG. 1 shows a schematic end view of a gearbox according to the invention.

1 designates an engine flywheel to which a clutch, generally designated 2, is connected. This clutch comprises a first disc 4, a second disc 5, a pressure plate 6 which is non-rotatably but axially displaceably joined to the flywheel, and a pressure plate 7 solidly joined to the flywheel. The disc 4 is joined to a first input shaft 8, carrying the gears 9 and 10 respectively for second and fourth respectively. The disc 5 is joined to the second input shaft 11, in the form of a hollow shaft journalled concentrically with the first shaft 8. This hollow shaft carries the input gears 12, 13 and 14 respectively for first, third and fifth speeds respectively.

A first and a second intermediate shaft 16 and 17 respectively are journalled in the gearbox housing 15 on either side of the input shafts 8,11 but in a plane spaced from said input shafts. These intermediate shafts each support a gear 18,19 respectively, securely fixed thereto, which engages the crown gear 20 of a differential, the housing of which is a portion of the gearbox housing 15 itself.

The intermediate shaft 16 carries a pair of freely rotatably journalled gears 21 and 22, which engage the gears 12 and 13, for first and third respectively, on the input shaft 11 and which are alternately lockable to the shaft by means of an engaging sleeve 23 which is axially displaceable but non-rotatable relative to the shaft. The intermediate shaft 17 has corresponding freely rotatably journalled gears 24 and 25, engaging gears 9 and 10 (second and fourth respectively) on the input shaft 8, as well as a gear 26 engaging the gear 14 for fifth on the second input shaft 11. With the aid of a pair of engaging sleeves 27 and 28, which are axially displaceable but non-rotatable relative to the shaft, the appropriate gear 24, 25 or 26 can be locked to the shaft.

According to the invention, gear 21 (first) on the intermediate shaft 16 is made with a hub 29, on which a gear 30 is rotatably journalled. An engaging sleeve 31 is displaceably but non-rotatably journalled on the hub 29 and makes is possible to lock the gear 30 to the hub for rotation together with gear 21 (first). As can be seen in FIG. 1, gear 30 engages gear 24 (second) on the intermediate shaft 17.

When driving in first, the movable pressure plate 6 presses the disc 5 against the fixed pressure plate 7, thus driving input shaft 11, while leaving input shaft 8 free. The torque is transmitted from gear 12 via gear 21, which is locked to the intermediate shaft 16, and gear 18 to the crown gear 20. In this driving situation, the gear 30 is released from the hub.

Figure 2:
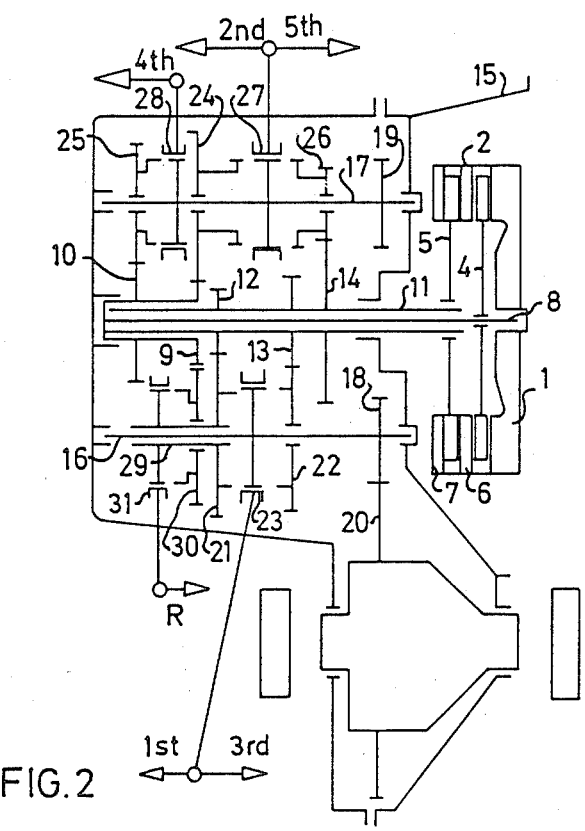
FIG. 2 shows a schematic view along the line II—II in FIG. 1.

Prior to shifting into second, preselection is effected by locking the intermediate shaft gear 24 (second) to the intermediate shaft 17 by means of engaging sleeve 27, and the shifting itself is thereafter completed by moving the movable pressure plate to the right in FIG. 2, so that it releases disc 5 and presses disc 4 against the flywheel 1. Continued speed shifting proceeds in the corresponding manner by alternately engaging/releasing the two clutch portions.

When engaging reverse, the reversing gear 30 is locked to the hub 29, which is kept released from the shaft 16, and the gear 24 (second) is then locked to the intermediate shaft 17 and the disc 5 is clamped between the movable and the fixed pressure plate 6,7 respectively. The torque is now transmitted from the gear 12 via gear 21 (first) and the reversing gear 30 to gear 24 (second), the rotational direction thereof is now counter to its normal rotational direction, thereby driving the crown gear 20 in the reverse direction.

In addition to the advantages stated in the introduction, the embodiment described above provides a reduction of rotational speed in two steps, which provides a better gear ratio for reverse. Furthermore, the existing synchronization of the second speed can be used for synchronizing reverse.

I claim:

1. Motor vehicle gearbox, comprising two concentrically journalled input shafts arranged to be driven only alternately, an output gear, and two spaced intermediate shafts having gears engaging gears on the input shafts, at least one gear in each pair of mutually engaging gears on said shafts being releasable from its shaft, the input shafts having a common axis spaced from the plane defined by the intermediate shafts, the intermediate shafts having a pair of mutually engaging gears, one of which is freely rotatable and can be locked by means of a locking means for rotation together with a releasable gear on the intermediate shafts to provide reverse, and the releasable gear provides the highest forward gear ratio, the other gear of said pair of mutually engaging gears on the intermediate shafts being the releasable gear providing the next highest forward gear ratio, each intermediate shaft having a non-releasable gear in constant mesh with said output gear.

2. Gearbox according to claim 1, in which said one gear is rotatably journalled on the hub of the gear for the highest forward gear ratio and is lockable thereto by means of an axially displaceable engaging sleeve on the hub.

3. Gearbox according to claim 2, in which one of said mutually engaging gears on the intermediate shafts can be locked for rotation together with the gear of the highest forward gear ratio on one intermediate shaft and engages the gear for the next highest forward gear ratio on the other intermediate shaft.

4. Gearbox according to claim 1, in which, in reverse, said releasable gear providing the highest forward gear ratio is released while said freely rotatable gear is locked to said releasable gear providing the highest forward gear ratio and said other gear is locked to its associated said intermediate shaft.

* * * * *